United States Patent
Leebow

(10) Patent No.: US 12,406,527 B2
(45) Date of Patent: Sep. 2, 2025

(54) SYSTEMS AND METHODS FOR CONTEXT-DEPENDENT AUGMENTED REALITY

(71) Applicant: FreezeCrowd, Inc., New York, NY (US)

(72) Inventor: Eric Leebow, New York, NY (US)

(73) Assignee: FREEZECROWD, INC., New York, NY (US)

( * ) Notice: Subject to any disclaimer, the term of this patent is extended or adjusted under 35 U.S.C. 154(b) by 488 days.

(21) Appl. No.: 17/718,438

(22) Filed: Apr. 12, 2022

(65) Prior Publication Data
US 2023/0326244 A1    Oct. 12, 2023

(51) Int. Cl.
| | |
|---|---|
| G06K 9/00 | (2022.01) |
| G06F 16/587 | (2019.01) |
| G06F 16/909 | (2019.01) |
| G06F 16/9535 | (2019.01) |
| G06V 20/20 | (2022.01) |
| G06V 40/16 | (2022.01) |
| H04L 51/224 | (2022.01) |

(52) U.S. Cl.
CPC .......... G06V 40/172 (2022.01); G06F 16/587 (2019.01); G06F 16/909 (2019.01); G06F 16/9535 (2019.01); G06V 20/20 (2022.01); H04L 51/224 (2022.05)

(58) Field of Classification Search
CPC .... G06V 40/172; G06V 20/20; G06V 40/161; G06V 40/20; G06F 16/587; G06F 16/909; G06F 16/9535; G06F 16/583; H04L 51/224; H04L 51/52
See application file for complete search history.

(56) References Cited

U.S. PATENT DOCUMENTS

2020/0058169 A1*  2/2020  Friesenhahn ...... G01C 21/1656
2021/0160657 A1    5/2021  Shingler

FOREIGN PATENT DOCUMENTS

CN        108305317 A  *  7/2018  ......... G06F 16/5854

OTHER PUBLICATIONS

Spotselfie, "Spotselfie™ Announces New Patent and New "urMojo™" Feature for Augmented Reality Social Application, Giving Users Total Control to Create Their Own Social Networks", Cision PR Newswire, Feb. 25, 2021, 4 pages.

* cited by examiner

Primary Examiner — Xin Jia
(74) Attorney, Agent, or Firm — CALFEE, HALTER & GRISWOLD LLP

(57) ABSTRACT

An augmented reality system includes an augmented reality (AR) device and a server computing device. The AR device transmits sensor data to the server computing device. The server computing device identifies a person and/or object in the sensor data. The server computing device executes a search over social network data to identify a portion of the social network data that relates to the identified person and/or object. The server computing device outputs augmentation data to the AR device that includes the identified portion of the social network data, and is configured to cause the AR device to display an augmentation that includes the portion of the social network data.

20 Claims, 9 Drawing Sheets

SYSTEMS AND METHODS FOR CONTEXT-DEPENDENT AUGMENTED REALITY

BACKGROUND

Virtual reality (VR) and augmented reality (AR) systems are currently being developed that are intended to provide sensory input that causes a user to perceive an alternate, virtual environment (in the case of VR) or virtual elements overlaid over the user's actual physical surroundings. For example, VR systems have been developed that provide visual, auditory, and/or haptic feedback to give a user the apparent sensation of moving and interacting with a completely virtual game environment.

AR systems have conventionally been configured to display virtual elements to a user by decoding structured patterns that are printed on or applied to objects. For example, a conventional AR system that employs a smartphone can be configured to identify a structured pattern in an image captured by a camera included on the smartphone. Responsive to identifying the structured pattern in the image, the conventional AR system can display, on a display of the smartphone, a virtual element proximal to or over a location of the structured pattern on the display. In such conventional AR systems, the virtual element can be reconstructed by the AR system based solely upon the structured pattern. For example, the AR system can be configured to decode the structured pattern to generate data from which the virtual element can be reconstructed according to a reconstruction algorithm. In other cases, the virtual element can be retrieved by the AR system from a network resource based upon information (e.g., a hyperlink) indicated by the structured pattern. Other conventional AR systems are configured to display virtual elements on a display based upon user input. For example, a conventional AR system can include a wearable display. The conventional AR system can be configured such that, responsive to a user depressing a button on the wearable display, a virtual element is displayed on the wearable display. For instance, responsive to the user depressing the button, a document can be displayed on the wearable display.

Whereas these conventional AR systems can display virtual elements that supplement a user's perception of the real world, these conventional AR systems either rely on structured patterns to be applied to objects in advance, or rely on user input to select and display appropriate supplemental virtual elements.

SUMMARY

The following is a brief summary of subject matter that is described in greater detail herein. This summary is not intended to be limiting as to the scope of the claims.

Various technologies pertaining to context-dependent augmented reality are described herein. With greater particularity, technologies described herein facilitate presentment of augmentations on a display of an AR/VR device that are indicative of social network data that relates to objects and/or persons that are present in the surroundings of the user of the AR/VR device.

In an exemplary embodiment, an AR system includes an AR/VR device and a server computing device that executes a social network server application. The social network server application maintains social network data that pertains to a plurality of users and is indicative of various characteristics and preferences of the users, relationships between the users, etc. The AR/VR device outputs sensor data to the social network server application, wherein the sensor data is indicative of the surroundings of the user of the AR/VR device. The social network server application identifies objects and/or persons in the sensor data. Responsive to identifying the objects/persons, the social network server application executes a search over the social network data for data that relates to the identified objects/persons. The social network server application outputs augmentation data to the AR/VR device, wherein the augmentation data includes results of the search. The search results can include, for example, identifiers of persons identified in the sensor data, relationships between persons identified in the sensor data, characteristics, roles, or preferences of persons identified in the sensor data, etc. The augmentation data is configured to cause the AR/VR device to display, within the context of actual objects present around the user of the AR/VR device, an augmentation that is indicative of the search results.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
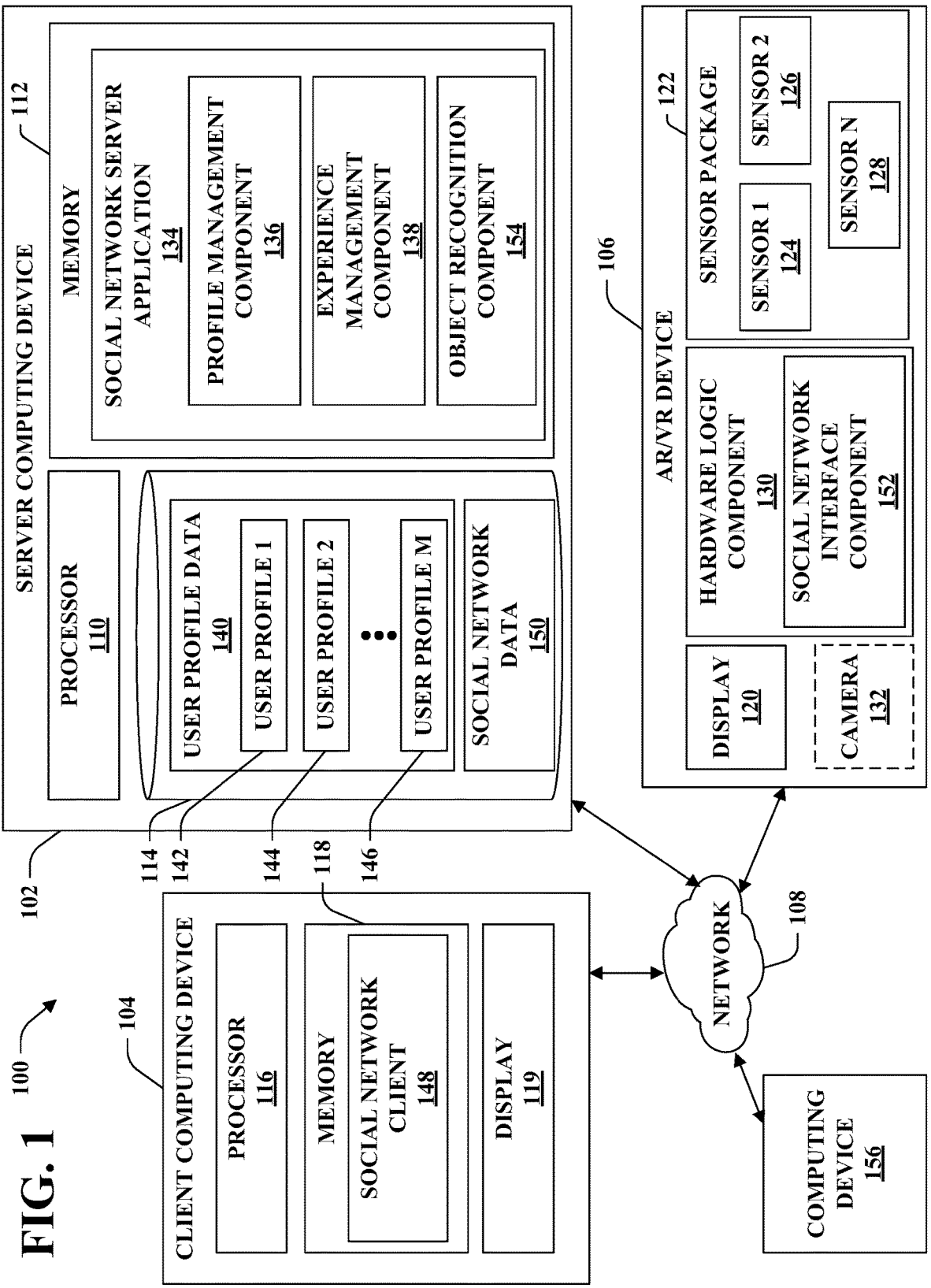
FIG. 1 is a functional block diagram of an exemplary AR/VR system.

Various technologies pertaining to presentment of context-dependent AR content on an AR/VR device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates interaction with a social network application by way of augmented/virtual reality (AR/VR) is illustrated, and supplementation of AR/VR content with data derived from or stored by a social network application. The system 100 includes a server computing device 102, a client computing device 104, and an AR/VR device 106, which devices 102-106 are in communication by way of a network 108. In exemplary embodiments, the network 108 is or includes the Internet, but it is to be understood that the network 108 can be or include any of other various networks included a local area network (LAN), a wide area network (WAN), an intranet, or other like communications infrastructure capable of facilitating the transfer of data between computing devices.

The server computing device 102 includes a processor 110, memory 112 that is operably coupled to the processor 110, and a data store 114. The memory 112 includes instructions that, when executed by the processor 110, cause the processor 110 to perform various acts. The data store 114 stores various data pertaining to a social network and that is accessible to the processor 110, as will be described in greater detail below. Briefly, the server computing device 102 is configured to manage and store data pertaining to a social network, and to interact with various client computing devices in connection with delivering social network-based content to the client computing devices (e.g., for display to users).

The client computing device 104 includes a processor 116 and memory 118 that is operably coupled to the processor 116 and that stores instructions that, when executed by the processor 116, cause the processor 116 to perform various acts. The client computing device 104 can further include a display 119 by way of which various data can be presented to a user of the client computing device 104. Briefly, the client computing device 104 can be configured to communicate with the server computing device 102 in connection with facilitating user interaction with a social network application.

The AR/VR device 106 includes a display 120, a sensor package 122 that comprises a plurality of sensors 124-128, and a hardware logic component 130. In embodiments wherein the AR/VR device 106 is configured as an AR device, the AR/VR device 106 includes a camera 132. While the camera 132 is illustrated as being distinct from the sensor package 122, it is to be understood that the camera 132 can be integrated into a sensor package that includes other sensors. For example, the camera 132 can be one of N sensors included in the sensor package 122. The N sensors can include but are not limited to additional cameras; position and orientation sensors such as gyroscopes; motion sensors such as accelerometers; aural sensors such as microphones; Briefly, the sensor package 122 is configured to receive input or stimuli from an operational environment of the AR/VR device 106 and to output data indicative of various objects in and physical features of that operational environment, and further to output data indicative of motion, position, and/or orientation of the AR/VR device 106 itself. The hardware logic component 130 is configured to receive sensor data from the sensor package 122 and to update content displayed to a user on the display 120 based upon the sensor data and/or data received by way of the network 108, as will be described in greater detail below.

Various details of the exemplary system 100 are now set forth. The memory 112 of the server computing device 102 includes a social network server application 134. In turn, the social network server application 134 comprises a profile management component 136 and an experience management component 138. The social network server application 134 receives data pertaining to a social network from client computing devices (e.g., the client computing device 104) by way of the network 108. By way of example, and not limitation, the social network server application 134 can receive user registration information, data indicative of user interactions with a social network client application, photos, videos, hyperlinks, text and other data. Responsive to receipt of various of these data, the profile management component 136 can update user profile data 140 that is stored by the data store 114. The user profile data 140 includes a plurality of M user profiles 142-146. Each of the user profiles 142-146 comprises data pertaining to a respective user that is registered with the social network server application 134. In exemplary embodiments, each of the user profiles 142-146 can contain public information that is readily accessible to other users registered with the social network server 134, private information that is only accessible to the user to whom the user profile pertains, and/or semi-private information that is accessible to the user to whom the user profile pertains and further to a subset of the total set of users registered with the social network server 134.

The memory 118 of the client computing device 104 includes a social network client application 148. The social network client 148 is configured to interface with the social network server 134 to allow a user of the client computing device 104 to view, share, modify, and otherwise interact with data maintained by and accessible to the social network server 134 (e.g., the user profile data 140). In an exemplary embodiment, the social network client 148 can, responsive to receiving input from a user of the client computing device 104, transmit a request to the social network server 134 that causes the social network server 134 to update a user profile in the user profiles 142-146 that is associated with the user of the client computing device 104. In other embodiments, the social network client 148 can transmit to the social network server 134 a request for some portion of semi-private data in the user profile data 140 that the user of the social network client 148 is authorized to access.

It is to be understood that in some embodiments, the social network server 134 can cause social network data to be stored in the data store 114 without being associated with a particular user profile. In these embodiments, the social network server 134 can be configured to selectively permit access to different portions of the social network data 150 based upon authorization data included in the user profiles 142-146. By way of example, and not limitation, the social network server 134 can store a photo as social network data 150. In various embodiments, the photo can be associated with metadata that indicates a list of users either specifically authorized or specifically not authorized to access the photo. Responsive to receiving a request to access the photo (e.g., from the social network client 148), the social network server 134 determines an authorization status of the user from whom the request originates. For example, if the user of the social network client 148 is specifically authorized to access the photo (e.g., because the user is depicted in the photo), the social network server 134 determines that the user is authorized to access the photo. If the user of the social network client 148 is specifically not authorized to access the photo, the social network server 134 determines that the user is unauthorized to access the photo. If the user is neither explicitly authorized or explicitly not authorized, the social network server 134 can determine whether the user of the social network client 148 based upon a default accessibility setting associated with the photo (e.g., private for default unauthorized, public for default authorized).

The experience management component 138 can be configured to retrieve and format data from the user profile data 140 and/or the social network data 150 in response to requests for such data received from the social network client 148. In an exemplary embodiment, responsive to a user logging in to the social network client 148, the social network client 148 transmits to the social network server 134 for data pertaining to a home view of the user of the social network client 148. The home view can be an initial formatting of information for presentation to the user that is displayed when the user first logs into the social network client 148. Responsive to receipt of the request, the experience management component 138 retrieves a home view configuration from a user profile in the user profiles 142-146 that is associated with the user of the social network client 148. Based upon the retrieved home view configuration, the experience management component 138 retrieves data from either or both of the user profile data 140 or the social network data 150, and transmits the retrieved data to the social network client 148. In an example, the home view configuration can indicate that the user of the social network client 148 wishes to see photos of friends of the user when the user logs into the social network client 148. In the example, the experience management component 138 retrieves photos of the user's friends from the social network data 150 and transmits the photos to the social network client 148, whereupon the social network client 148 displays the photos on the display 119.

The social network server application 134 is further configured to communicate with the AR/VR device 106 to allow the AR/VR device 106 to supplement or generate an augmented or virtual reality experience based upon social network data (e.g., the user profile data 140 or the social network data 150). The hardware logic component 130 is configured to generate an augmented or virtual reality experience for a user by display of various content on the display 120. The display 120 can be, for example, a wrap-around display screen, such as a liquid crystal display (LCD) or organic light emitting diode (OLED) display. In embodiments wherein the AR/VR device 106 is configured for AR operation, the display 120 can be an electronic display integrated within a substantially transparent lens through which a user of the AR/VR device 106 views her surroundings. For example, the display 120 can be integrated into a set of glasses worn on the user's face.

In VR operation, the hardware logic component 130 causes display of a virtual environment on the display 120. The hardware logic component 130 receives sensor data from the sensor package 122, which sensor data can be indicative of a position or orientation of a user's head, a direction of view of the user's eyes, locations of a user's hands, locations of other objects or boundaries in the actual surroundings of the user, etc. Based upon these sensor data, the hardware logic component 130 generates a virtual environment that is displayed on the display 120 of the AR/VR device 106 in a manner such that, from the perspective of a user of the AR/VR device 106, the user is located within the virtual environment.

In AR operation, the hardware logic component 130 causes selective display, on the display 120, of one or more virtual objects or features such that the user of the AR/VR device 106 perceives the virtual objects or features to be present within the actual surroundings of the user. By way of example, and not limitation, the hardware logic component 130 can receive sensor data from the sensor package 122 and images from the camera 132. The sensor data received from the sensor package 122 can include data that is substantially similar to the sensor data received from the sensor package 122 when the AR/VR device 106 is configured for VR operation. In various embodiments, the sensor data received by the hardware logic component 130 from the sensor package 122 can further include location data that is indicative of a position of a user of the AR/VR device 106. By way of example, and not limitation, one of the sensors 124-128 can be a GPS sensor, and the sensor data output by the sensor package 122 can include GPS coordinates of the user.

The images received by the hardware logic component 130 from the camera 132 can be images of that portion of the surroundings of a user of the AR/VR device 106 that is presently within the user's field of view. In some embodiments, the hardware logic component 130 is configured to analyze images received from the camera 132 and to identify in the images various objects, locations, or occurrences. These objects, locations, or occurrences are alternately referred to herein as augmentation triggers, and can be substantially anything that is observable in the images generated by the camera 132. Responsive to identifying an augmentation trigger in an image output by the camera 132, the hardware logic component 130 can cause an augmentation to be displayed on the display 120 at or proximal to a location of the augmentation trigger on the display 120. The augmentation can be any of various visual effects or indicia that are related to the augmentation trigger. By way of example, and not limitation, an augmentation trigger can be a landmark such as a building, a geologic formation, or the like, and the augmentation can be text that pertains to the landmark.

In various exemplary embodiments wherein the AR/VR device 106 is configured to function as an AR device, the AR/VR device 106 can be configured to facilitate user interaction with an augmentation displayed on the display 120. Continuing the previous example, the hardware logic component 130 can be configured to cause a selectable button to be displayed on the display 120 proximal to the landmark. A user can select the selectable button by way of various input that are detectable by the sensor package 122 and/or the camera 132. For example, the hardware logic component 130 can detect, in an image generated by the camera 132, that the user of the AR/VR device 106 has moved her hand to a location that aligns with the selectable button in the user's field of view. Responsive to such detection, the hardware logic component 130 can replace the selectable button on the display 120 with a text box that includes text pertaining to the landmark. In another example, the hardware logic component 130 can detect, based upon sensor data output by the sensor package 122, that the user of the AR/VR device 106 is looking at the selectable button. Responsive to such detection, the hardware logic component 130 can replace the selectable button on the display 120 with the text box that includes text pertaining to the landmark.

In an exemplary embodiment, the hardware logic component 130 includes a social network interface component 152. The social network interface component 152 is configured to communicate with the social network server 134 (e.g., by way of the network 108) to request and receive data from the social network server 134. In some embodiments, the social network interface component 152 can be configured in substantially similar fashion to the social network client 148 such that the social network interface component 152 is another instance of the same social network client application as the social network client 148 that executes on the client computing device 104. In other embodiments, the social network interface component 152 can have different functionality. In various embodiments the social network interface component 152 can both receive social network data from the server computing device 102 and transmit data to the server computing device 102 for inclusion of such data in either or both of the user profile data 140 or the social network data 150. The hardware logic component 130 can be configured to cause a virtual environment or an augmentation to an actual environment to be displayed on the display 120 based upon the social network data received from the server computing device 102.

In an exemplary, non-limiting embodiment, the AR/VR device 106 transmits sensor data generated by the sensor package 122 and/or the camera 132 to the server computing device 102. For instance, the sensor data can be or include an image of the surroundings of a user of the AR/VR device 106, a location of the user of the AR/VR device 106, an audio or video recording of the surroundings of the user of the AR/VR device 106, etc. The social network server application 134 can be configured to identify a presence of at least one object or person in the sensor data received by the server computing device 102. The social network server application 134 can include an object recognition component 154 that is configured to receive one or more different types of sensor data and to identify objects and people in the sensor data.

In a non-limiting example, in embodiments wherein the sensor data includes an image of the surroundings of the user of the AR/VR device 106, object recognition component 154 can be configured to identify, in the image, the presence of a person who is registered with the social network server application 134 or who is otherwise defined or indicated in the social network data 150. The object recognition component 154 can be configured to identify the presence of a person in the image. For example, the object recognition component 154 can be configured to identify a subset of pixels of the image that are likely representative of a human face. In exemplary embodiments, the object recognition component 154 executes a facial recognition algorithm over the identified subset of the pixels of the image and a set of images of known persons in the social network data 150 to compare the identified subset of the pixels to the set of images of the known persons. The object recognition component 134 can identify a person in the image as one of the known persons by determining that the identified subset of pixels of the image is likely to be representative of that known person.

In another example, the social network server application 134 can identify, in an image included in the sensor data, the presence of an object. For example, the object recognition component 154 can execute an object recognition algorithm over the image. By executing the object recognition algorithm, the object recognition component 154 identifies pixels in the image that are representative of a same object and further identifies one or more categories of the object. By way of example, the object recognition component 154 can determine that a subset of pixels of the image are representative of a ball, and further that these pixels are representative of a basketball, where ball and basketball are categories of the object.

Responsive to identifying a person or an object in the sensor data, the social network server application 134 can identify a portion of the social network data 150 that relates to the identified person or object. In exemplary embodiments, the social network server application 134 executes a search over the social network data 150 based upon an identifier of a person or a category or type of an object. By executing the search, the social network server application 134 generates search results that comprise a portion of the social network data 150 that relates to the identified person or object.

In a non-limiting example, responsive to determining that a portion of an image in the sensor data received from the AR/VR device 106 is representative of a known person, the social network server application 134 can execute a search over the social network data 150 and/or the user profile data 140 for data that relates to the known person. In this example, search results identified by the social network server application 134 can include an identifier of the known person (e.g., a username, a legal name, or an alias of the known person). If the known person is a user registered with the social network server application 134, the search results can include a portion of a user profile of the known person (e.g., included in the user profiles 142-146). For instance, the search results can be a public portion of the user profile of the known person.

In another example, responsive to determining that a portion of an image in the sensor data is representative of an object in a category, the social network server application 134 can execute a search over the social network data 150 and/or the user profile data 140 for data that relates to the category of the object. In this example, the search results generated by the social network server application 134 can include identifiers of users that are registered with the social network server application 134 and who have some connection with the object category. For purposes of illustration, if the identified object has an associated category of "basketball," the search results can include identifiers of users whose user profiles indicate that they are interested in basketball.

Responsive to identifying the portion of the social network data 150 that relates to the identified person or object, the social network server application 134 can output the identified portion of the social network data 150 to the AR/VR device 106 by way of the network 108. In exemplary embodiments, the social network server application 134 outputs augmentation data to the AR/VR device 106 that is configured to cause the AR/VR device 106 to display an augmentation on the display 120 that is indicative of the identified portion of the social network data 150. The augmentation data output by the social network server application 134 can include the portion of the social network data identified by the social network server application 134 as being relevant to the person or object identified in the sensor data. In some embodiments, the augmentation data can further include data that facilitates generation of the augmentation on the display 120 by the hardware logic component 130. By way of example, and not limitation, the augmentation data can include a location in the sensor data (e.g., a set of pixels in an image) at which the identified object or person is located. The hardware logic component 130 can display the augmentation on the display 120 based upon the location indicated in the sensor data. For instance, the hardware logic component 130 can display the augmentation at a location on the display 120 that is proximal to a location at which the identified object or person is depicted or located.

From the foregoing, it is to be appreciated that the system 100 can provide an AR system wherein augmentations presented on a display of an AR device are context-based. In other words, the system 100 facilitates presenting augmentations on an AR device that are based upon identities of people and/or categories of objects that are present in an environment of a user of the AR device. Furthermore, the system 100 facilitates the incorporation of social network data (e.g., user profile data 140 and/or the social network data 150) into augmentations displayed on an AR device.

It is to be understood that in some embodiments, rather than providing sensor data to the social network server application 134, the hardware logic component 130 can be configured to identify the presence of an object or person in the sensor data generated by the sensor package 122. In some further embodiments, the hardware logic component 130 can output the sensor data to a different computing device 156 that is in communication with the AR/VR device 106 by way of the network. The computing device 156 can be configured to recognize objects and people in the sensor data and to output indications of recognized objects and people to the AR/VR device 106. In these various embodiments, responsive to identifying an object or person in the sensor data or receiving an identification of an object or person in the sensor data from the computing device 156, the hardware logic component 130 can output an indication of the presence of the object or person in the sensor data to the social network server application 134. The social network server application 134, responsive to receipt of the indication, can identify a portion of the social network data 150 that relates to the indicated object or person. Thereafter, the social network server application 134 outputs the identified portion of the social network data 150 to the AR/VR device 106 by way of the network 108, as described above.

Figure 2:
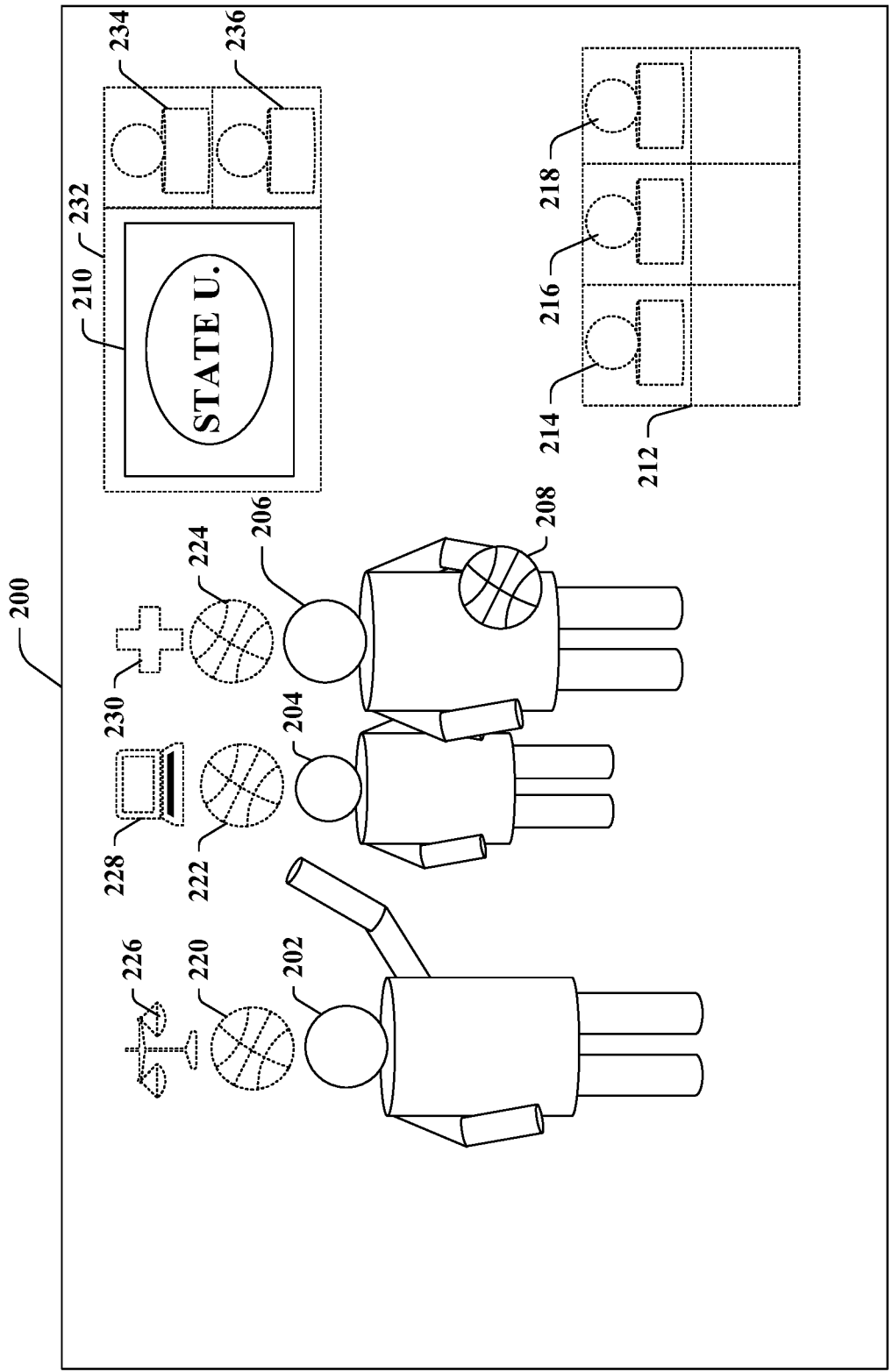
FIG. 2 is a diagram of an exemplary AR environment.

Various non-limiting examples of aspects described above are now set forth. Referring now to FIG. 2, an exemplary AR environment 200 is shown. The AR environment 200 can be, for example, a view of a user of the AR/VR device 106 when viewing the display 120 of the AR/VR device. By way of further illustration, in embodiments wherein the display 120 of the AR/VR device 106 comprises a display integrated into a transparent lens, the AR environment 200 can be a view of the user of the AR/VR device 106 when looking at her surroundings through the transparent lens. In other embodiments, wherein the display 120 of the AR/VR device 106 comprises a display that obscures the user's direct view of her surroundings, the AR environment 200 can be displayed as a series of video frames that depict the surroundings of the user (e.g., as viewed by the camera 132) in addition to one or more augmentations.

For the sake of consistency, certain objects in the AR environment 200 will be referred to herein as actual and/or physical objects, whereas other objects in the AR environment 200 will be referred to as virtual objects, AR objects, or augmentations. Actual and/or physical objects are those that have a physical presence in the surroundings of the user. Virtual objects, AR objects, or augmentations are those objects that do not have a physical presence in the surroundings of the user and appear extant to the senses of the user by virtue of functionality of the AR/VR device 106. It is to be understood that, in embodiments wherein the user's direct view of her surroundings is obscured by the display 120, objects in the AR environment 200 referred to herein as actual objects or physical objects may be observed by the user as reproductions on the display 120 rather than directly. To facilitate understanding, actual/physical objects in the AR environment 200 are represented with solid lines, whereas virtual objects, AR objects, or augmentations are represented with dashed lines.

The exemplary AR environment 200 includes a plurality of people 202-206. The exemplary AR environment 200 further includes two objects: a basketball 208 and a flag 210. These objects 202-210 are physical objects in the surroundings of the user of the AR/VR device 106. The AR/VR device 106 can capture an image of the surroundings of the user (e.g., an image that includes the objects 202-210). The AR/VR device 106 can transmit the image to the server computing device 102, whereupon the object recognition component 154 of the social network server application 134 can identify the objects 202-210 in the image. In other embodiments, the hardware logic component 130 of the AR/VR device 106 can identify the objects 202-210 and transmit identifiers of the objects 202-210 to the social network server application 134.

Responsive to identifying the objects 202-210 or receiving identifiers of the objects 202-210 from the AR/VR device 106, the experience management component 138 performs a search over the user profile data 140 and/or the social network data 150 for data pertaining to the identified objects 202-210. In various non-limiting examples, search results generated by the experience management component 138 can include a user profile or portion of a user profile in the user profiles 140 that belongs to one of the identified persons 202-206 in the environment 200, data indicative of a relation between two or more of the identified persons 202-206 (e.g., an indication that the persons 202-206 belong to a same organization, have indicated themselves as friends to the social network server application 134, or have indicated similar interests). In further examples, search results generated by the experience management component 138 can include data in the user profile data 140 or the social network data 150 that has a relation to a category associated with one of the non-person objects 208, 210. For instance, based upon the AR environment 200 including the basketball 208, the search results can include identifiers of users who are represented by a user profile in the user profile data 140 and whose user profile indicates that the user is interested in basketball. In another example, based upon the AR environment 200 including the flag 210, the search results can include identifiers of users who attended a university with which the flag is associated, which university can be identified as a category to which the flag 210 belongs or with which the flag 210 is associated.

The experience management component 138 can perform distinct searches over the user profile data 140 and/or the social network data 150 for each of the identified objects 202-210 in the AR environment 200. In still further examples, the experience management component 138 can perform the search over the user profile data 140 and/or the social network data 150 based jointly upon all of the objects 202-210 or some subset of the objects 202-210. In other words, the experience management component 138 can perform the search over the user profile data 140 and/or the social network data 150 to identify relations between objects in the objects 202-210 that are indicated by the data 140, 150. In an illustrative, non-limiting example, the experience management component 138 can be configured to identify whether the persons 202-206 have a connection (indicated in the data 140, 150) with basketball based upon the basketball 208 being present in the AR environment 200. In another example, the experience management component 138 can identify search results pertaining to a university basketball team based upon the basketball 208 and the flag 210 that is representative of the university being present in the AR environment 200.

In some embodiments, the experience management component 138 can be configured to identify connections between people and objects or between two objects in an AR environment (e.g., the environment 200) based upon a proximity of the objects and/or people in the environment. For example, the object recognition component 154 can be configured to determine locations of the identified objects 202-210 in the AR environment based upon the sensor data received by the server computing device 102 from the AR/VR device 106. The experience management component 138 can be configured to execute the search over the user profile data 140 and the social network data 150 to identify connections between objects in the objects 202-210 that are within a threshold distance of one another. By way of example, and not limitation, the object recognition component 154 can search for connections between the second and third persons 204, 206 and the category "basketball" based upon the second and third persons 204, 206 being within a threshold distance of the basketball 208.

Responsive to generating the search results pertaining to the objects 202-210, the experience management component 138 outputs augmentation data to the AR/VR device 106 that includes the search results and is configured to cause the social network interface component 152 to display, on the display 120, augmentations that are indicative of the search results. By way of example, and not limitation, the augmentation data can be configured to cause the AR environment 200 (e.g., displayed on the display 120) to include a tray 212 that includes indicators 214-218 of the various identified persons in the AR environment 200. The tray 212 includes a first indicator 214 of the first person 202, a second indicator 216 of the second person 204, and a third indicator 218 of the third person 206. In exemplary embodiments, the indicators 214-218 can include thumbnail photos of the persons 202-206 that are included in the user profile data 140 or the social network data 150 and are further included in the augmentation data by the experience management component 138. The indicators 214-218 can instead or additionally include legal names, usernames, or aliases of the persons 202-206.

The augmentation data can further be configured to cause the AR environment 200 to include indicators of roles of the persons 202-206 or group affiliations of the persons 202-206. By way of example, the search results generated by the experience management component 138 can indicate that the persons 202-206 are members of a basketball team. The augmentation data can be configured to cause the AR environment 200 to include indicators 220-224 that are positioned proximally to the persons 202-206, respectively, wherein the indicators 220-224 indicate that the persons 202-206 are in some way associated with the category "basketball." For example, the indicators 220-224 can be pictorial representations of basketballs. By way of further example, the search results generated by the experience management component 138 can indicate that the first person is a law student, the second person 204 is a computer science student, and the third person 206 is a medical student. The augmentation data can be configured to cause the AR environment 200 to include an indicator 226 that indicates that the first person 202 is a law student to be displayed proximally to the first person 202, an indicator 228 that indicates that the second person 204 is a computer science student to be displayed proximally to the second person 204, and an indicator 230 that indicates that the third person 206 is a medical student to be display proximally to the third person 206. It is to be understood from the foregoing that the augmentation data can be configured to cause augmentations to be displayed in the AR environment 200 proximally to the actual objects to which the augmentation pertain.

The augmentation data can further be configured to cause the AR environment 200 to include indications of people who are potentially associated with or related to the objects 208, 210 or categories associated with the objects 208, 210 in the environment 200. By way of example, the AR environment 200 can include a second tray 232 that is proximal to the flag 210. The second tray 232 includes indicators 234, 236 of persons who are indicated in the user profile data 140 and/or social network data 150 as being associated with or related to the university with which the flag 210 is associated.

It is to be understood that the experience management component 138 can generate the search results based further upon an identity and/or role of the user of the AR/VR device 106. By way of example, and not limitation, the social network interface component 152 can be configured to transmit data indicative of the identity of the user of the AR/VR device 106 to the social network server application 134. Hence, upon receipt of sensor data from the AR/VR device 106 or identities of objects identified by the AR/VR device 106, the experience management component 138 performs a search over the user profile data 140 and the social network data 150 to generate search results that have a relation to both the identified objects and the user the of AR/VR device 106. In an example, the experience management component 138 can generate search results that include shared interests of the user of the AR/VR device 106 and a person identified in the sensor data.

In another example, the user of the AR/VR device 106 may be a doctor, and the AR/VR device 106 may be deployed in a healthcare facility. In such embodiments, the experience management component 138 performs the search over the user profile data 140 and the social network data 150 based up on the user being a physician. For instance, the experience management component 138 can perform the search to identify health data pertaining to an identified person. The search results returned to the AR/VR device 106 can include the identified health data, and an augmentation displayed on the display 120 of the AR/VR device 106 can include or be indicative of the health data. Due to the sensitive nature of health information, some people may not wish to share their health information. Therefore, in some embodiments the experience management component 138 can fail to return search results that include health data with respect to identified persons that are not registered with the social network server application 134. In further embodiments, the experience management component 138 can fail to return search results that include health data with respect to identified persons who are registered with the social network server application 134, but whose user profile in the user profile data 140 indicates that the user does not wish to share health information. In still further embodiments, the experience management component 138 can fail to return search results that include health data to any AR/VR device that is not being operated by a clinician with whom an identified person has consented to share health information.

From the foregoing example, it is to be appreciated that the user profile data 140 and/or the social network data 150 can include data, such as user health data, that is not conventionally maintained by a social network application. It is further to be appreciated that data that is not conventionally maintained by a social network application can in some embodiments be retrieved by the experience management component 138 from a different computing system (e.g., the computing device 156) in connection with executing a search for data pertaining to an identified person or object.

The experience management component 138 can further be configured to save, or freeze, a snapshot of portions of the AR environment 200. In various embodiments, the social network server application 134 can be a crowd-based social network application such as the Freezecrowd social network application. Responsive to identifying or receiving an indication that the persons 202-206 are present in the AR environment 200, the social network server application 134 can be configured to save, in the social network data 150, an indication that the persons 202-206 and the user of the AR/VR device 106 were in a same location at a same time. For example, in response to identifying the persons 202-206 in an image of the AR environment 200, the social network server application 134 can save the image and the search results associated with the objects 202-210 identified in the image in the social network data 150. Subsequently, the AR/VR device 106 can issue a request for the image. Responsive to receipt of the request, the social network server application 134 retrieves the image and associated search results from the social network data 150. The social network server application 134 can output, to the AR/VR device 106, the image and augmentation data that is based upon the search results associated with the image. Based on the image and the augmentation data, the AR/VR device 106 can cause a recreation of the AR environment 200 to be displayed on the display 120, wherein the recreation comprises the various augmentations included in the environment 200, as well as virtual elements that are representative of the actual objects 202-210 in the environment 200.

In some embodiments, saving a snapshot of the AR environment 200 can be performed by the social network server application 134 in response to receipt of user input received at the AR/VR device 106 when the AR environment 200 is displayed on the display 120. In other embodiments, a snapshot of the AR environment 200 can be saved by the social network server application 134 in response to various other conditions, such as the presence of a pre-defined number of identified persons in an AR environment. In some instances, the social network server application 134 can be configured to save only those augmentations that pertain to persons present in the environment, to facilitate further social interaction between the persons and the user of the AR/VR device 106 after the user has left the environment.

Referring once again to FIG. 1, the system 100 can further be configured to facilitate updating the user profile data 140 and/or the social network data 150 based upon user interaction with augmentations displayed on the display 120 of the AR/VR device 106. The AR/VR device 106 is configured to detect one or more of various types of user interaction with augmentations displayed on the display 120 of the AR/VR device 106. For instance, one or more of the sensors in the sensor package 122 can be configured to detect user interaction with augmentations displayed on the display 120. By way of example, and not limitation, one of the sensors 124-128 of the AR/VR device 106 can include a camera that detects that a user has directed her gaze toward an augmentation that is displayed on the display 120. In such example, the hardware logic component 130 of the AR/VR device 106 can determine that the user intends to interact with an augmentation when the AR/VR device 106 detects that the user has blinked twice in succession while looking at the augmentation. In another example, the AR/VR device 106 can be configured to detect that a user's hand, when viewed from the perspective of the user, is positioned in alignment with an augmentation on the display 102. The hardware logic component 130 of the AR/VR device 106 can be configured to determine that the user intends to interact with the augmentation when the user keeps her hand in alignment with the augmentation for an amount of time greater than a pre-defined threshold time.

Responsive to determining that the user of the AR/VR device 106 intends to interact with an augmentation displayed on the display 120, the hardware logic component 130 can perform an action relative to the augmentation with which the user intends to interact. In an example, responsive to identifying an interaction of the user of the device 106 with an augmentation, the hardware logic component 130 can retrieve and/or cause additional data pertaining to the augmentation to be displayed on the display 120. For example, and referring once again briefly to FIG. 2, responsive to determining that the user intends to interact with the basketball indicator 220, the hardware logic component 130 can transmit a search query for search results relating to basketball to a computing device 156 that is in communication with the AR/VR device 106 by way of the network 108. The computing device 156 can be, for example, a search engine server computing device that is configured to receive queries from other devices on the network 108 and to return search results pertaining to the queries. In response to receiving the query from the AR/VR device 106, the computing device 156 can transmit search results relating to basketball to the AR/VR device 106. The hardware logic component 130 can then cause the search results to be displayed on the display 120 (e.g., proximal to the selected indicator 220).

In some embodiments, the AR/VR device 106 is configured to facilitate user interaction with the social network maintained by the social network server application 134 by way of user interaction with augmentations displayed on the display 120. For example, the social network interface component 152 of the hardware logic component 130 can be configured to transmit interaction data to the social network server application 134 responsive to the hardware logic component 130 determining that the user of the AR/VR device 106 has interacted with an augmentation on the display 120. The interaction data is indicative of the interaction of the user with the augmentation. The interaction data is configured to cause the social network server application 134 to take some action relative to the user profile data 140 or the social network data 150 based upon the interaction of the user with the augmentation.

An action performed by the social network server application 134 responsive to receipt of the interaction data can depend on the augmentation with which the user interacted and a type of the interaction. For example, a user of the AR/VR device 106 can interact with augmentations in multiple different ways. The interaction data can be indicative of the manner in which the user of the AR/VR device 106 interacted with an augmentation. The social network server application 134 can be configured to take different actions with respect to a same augmentation based upon different modes of interaction of the user with the augmentation. In other words, responsive to the user performing a first interaction with an augmentation, the social network server application 134 can take a first action with respect to the augmentation. Responsive to the user performing a second interaction with the augmentation, the social network server application 134 can take a second action with respect to the augmentation.

The system 100 can facilitate updating or modification of the user profile data 140 and/or the social network data 150 based upon interactions of a user of the AR/VR device 106 with augmentations displayed on the display 120. In an exemplary embodiment, the interaction data output by the AR/VR device 106 to the social network server application 134 can indicate that the user intends to perform an action with respect to an augmentation that involves a modification of the user profile data 140 and/or the social network data 150. For example, and referring once again to FIG. 2, the user of the AR/VR device 106 can interact with the indicator 214 of the first identified person 202 in the environment 200 in a manner that indicates that the user wishes to add the first identified person 202 to a list of friends or known contacts. The interaction data output by the AR/VR device 106 with respect to this interaction can indicate that the user wishes to add the first identified person 202 to the list of friends or known contacts. Responsive to receipt of the interaction data, the social network server application 134 updates a portion of the user profile data 140 that pertains to the user of the AR/VR device 106 (e.g., the first user profile 142) to indicate that the user of the AR/VR device 106 and the first person 202 are friends. The AR/VR device 106 and the social network server application 134 can perform similar functionality in response to user interaction with any of the indicators 214-218, 234, 236.

It is to be understood that interaction by the user with the indicators 214-218 associated with the people 202-206 present in the environment 200 can be configured to facilitate any of various interactions with the people 202-206 present. For example, interaction with the indicator 214 by the user of the AR/VR device 106 can cause the social network server application 134 to transmit a message to a device with which the first person 202 is associated or to an inbox associated with the first person 202 and that is maintained by the social network server application 134. In still further examples, interaction with the indicator 214 by the user of the AR/VR device 106 can cause the social network server application 134 to initiate or facilitate a transfer of funds from the user of the AR/VR device 106 to the first person 202. In these examples, the social network server application 134 can interact with one or more computing systems (e.g., the computing device 156) that are affiliated with a financial institution in order to facilitate the transfer of funds.

Figure 3:
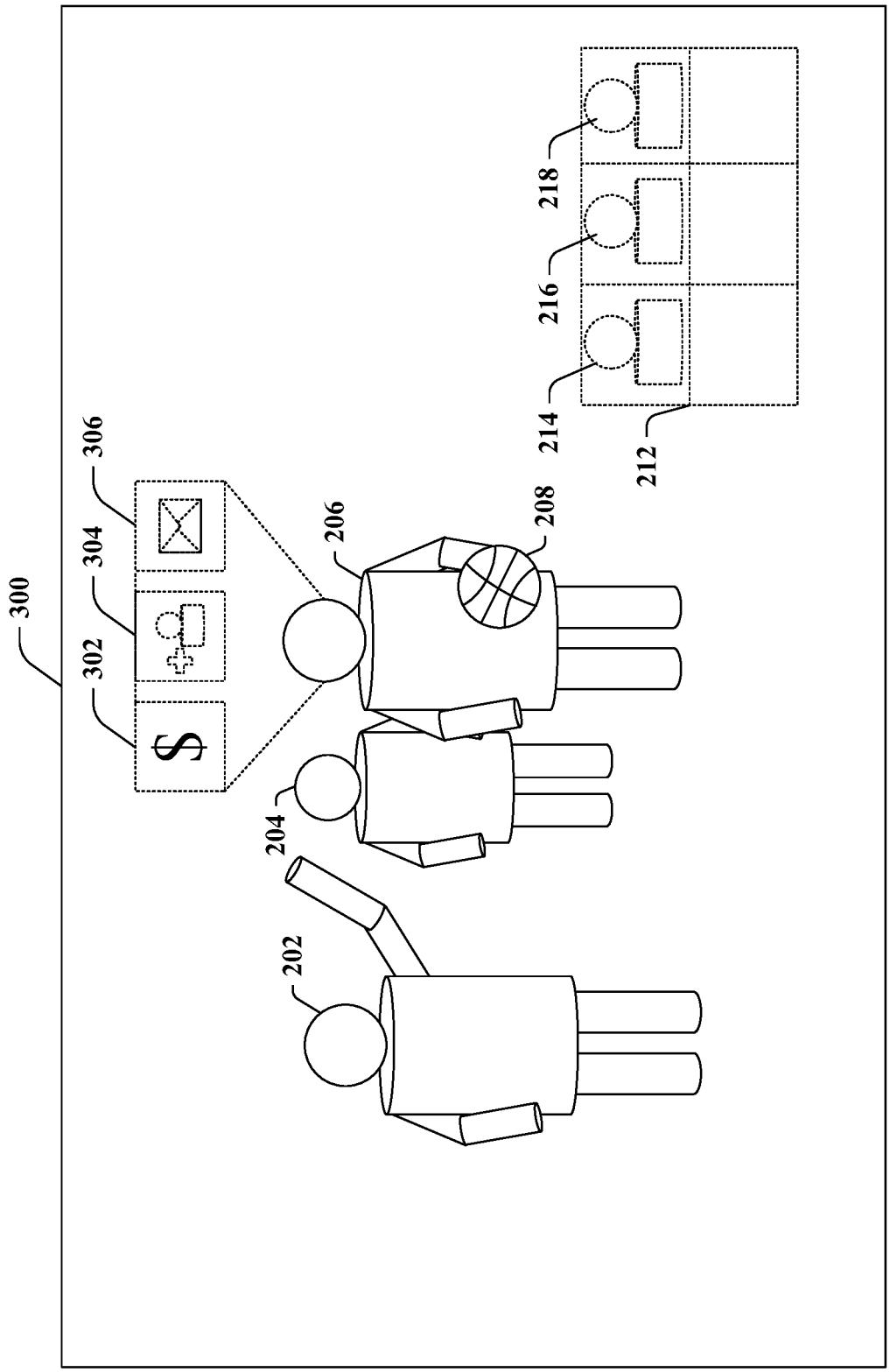
FIG. 3 is a diagram of another exemplary AR environment.

As indicated above, user interaction with an AR environment can cause the AR environment to change, such that different or additional augmentations are displayed by an AR/VR device response to receipt of user input. Referring now to FIG. 3, an exemplary AR environment 300 is shown, wherein the environment 300 includes the people 202-206. In an exemplary embodiment, the AR environment 300 can be presented responsive to user interaction with the third person 206 and/or the indicator 218 of the third person 206 in the environment 200. In a non-limiting example, a user can gesture or look towards the person or the indicator 218. Responsive to detecting this user input (e.g., based upon sensor data output by the sensor package 122), the AR/VR device 106 can update the AR environment 200 such that the AR environment 300 is displayed on the display 120. The AR environment 300 includes selectable elements 302, 304, 306 that facilitate further user interaction with the third person 206. The selectable elements 302-306 can be displayed proximally to the third person 206 in a FOV of the user of the AR/VR device 106 (e.g., above the third person 206). The selectable element 302 can be a selectable element that, when selected, facilitates sending payment to or requesting payment from the third person 206. The selectable element 304 can be a selectable element that, when selected, causes the third person 206 to be added as a contact of the user of the AR/VR device 106. The selectable element 306 can be a selectable element that, when selected, facilitates sending a message to the third person 206.

In some embodiments, the server computing device 102 and the AR/VR device 106 are configured to interface with other devices to facilitate identification of people and/or objects in the surroundings of a user of the AR/VR device 106. These embodiments may be well-suited to providing context-based AR content informed by social network data in environments in which the user is present in a crowd of people.

Figure 4:
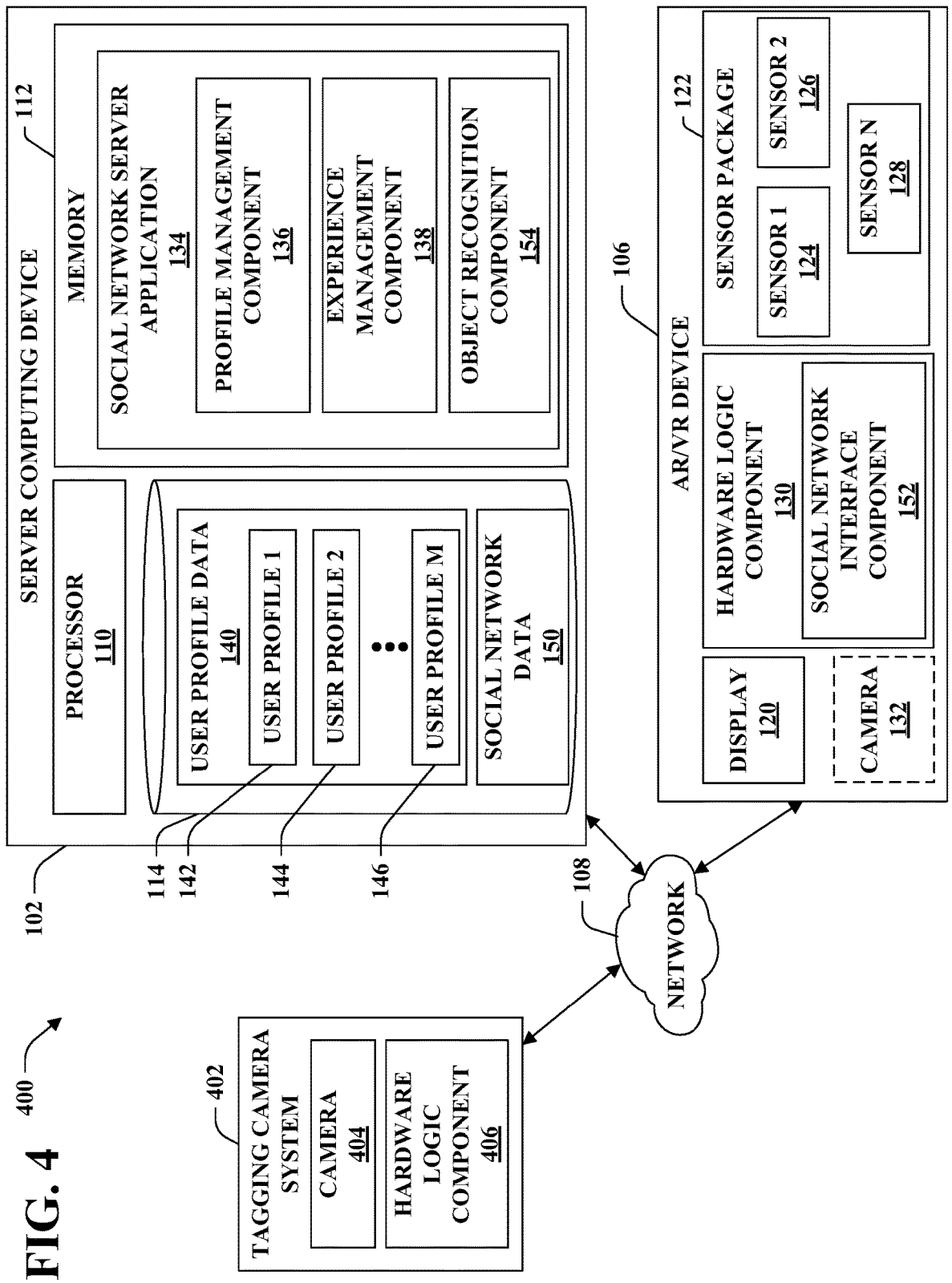
FIG. 4 is a functional block diagram of another exemplary AR/VR system.

Referring now to FIG. 4, an exemplary system 400 that facilitates presentment of context-based AR content to a user present in a crowd of people is illustrated. The system 400 includes the server computing device 102 that executes the social network server application 134 and the AR/VR device 106. In the system 400, the server computing device 102 and the AR/VR device 106 communicate by way of the network 108. The system further includes a tagging camera system 402 that is in communication with the server computing device 102 by way of the network 108. Briefly, the tagging camera system 402 is configured to capture images of an environment and to transmit these images to the server computing device 102. The social network server application 134 identifies people and objects in the images. The social network server application 134 can output augmentation data indicative of the identified people and objects to the AR/VR device 106 when the social network server application 134 determines that a user of the AR/VR device 106 is present in the environment depicted in the images.

The tagging camera system 402 includes a camera 404 and a hardware logic component 406. The camera 404 captures images of an environment that is in a field-of-view of the camera 404. The hardware logic component 406 transmits images captured by the camera 404 to the server computing device 102 by way of the network 108. Responsive to receipt of an image from the tagging camera system 402, the object recognition component 154 of the social network server application 134 identifies objects and people depicted in the image. Responsive to determining that a user of the AR/VR device 106 is present in the environment depicted in the image, the social network server application 134 outputs augmentation data to the AR/VR device 106. The augmentation data pertains to the identified objects and people in the environment depicted in the image. Responsive to receipt of the augmentation data, the social network interface component 152 causes augmentations to be displayed on the display 120, the augmentations being augmentations that comprise data pertaining to the objects and people in the environment that were identified by the object recognition component 154.

Figure 5A:
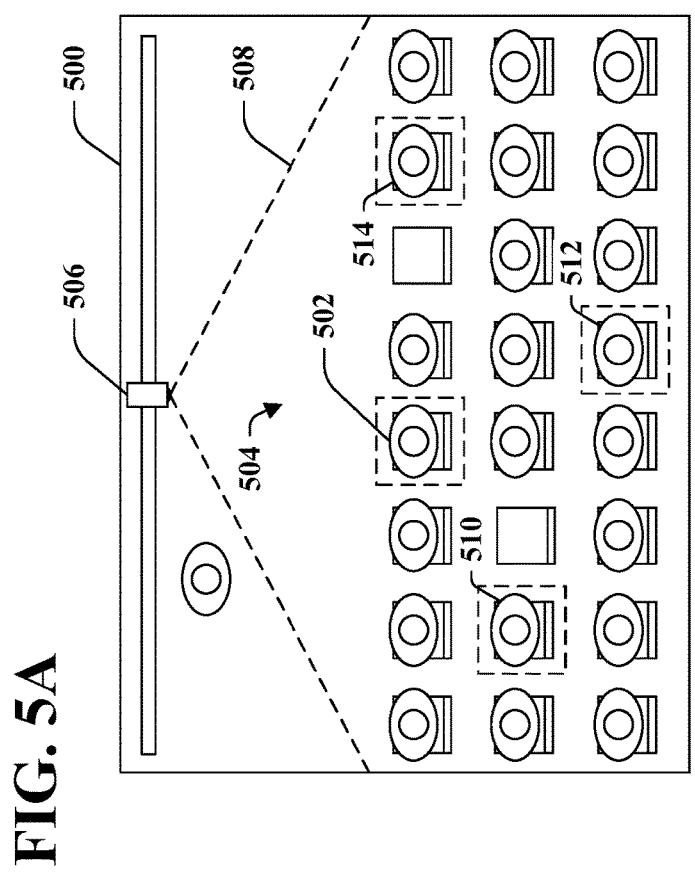
FIG. 5A is a top-down view of an exemplary operational environment of an AR system.
Figure 5B:
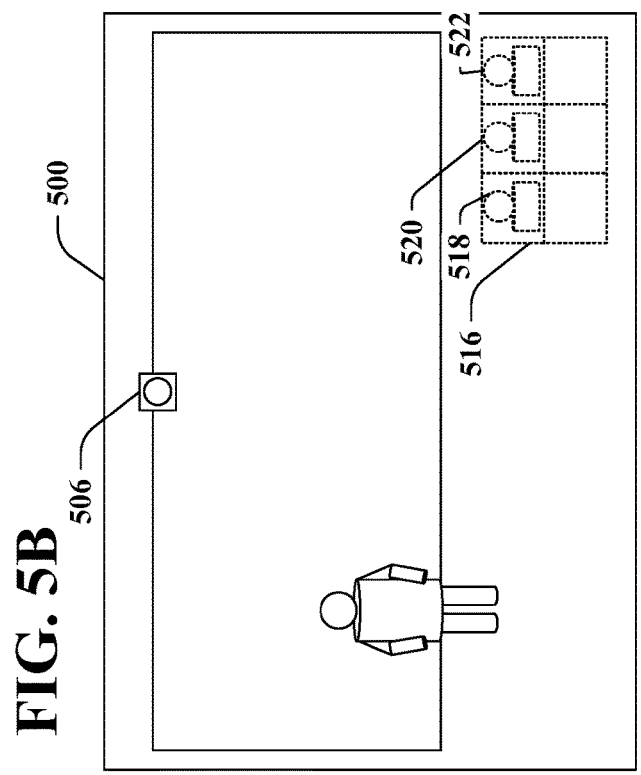
FIG. 5B is a view of an exemplary AR environment based upon the operational environment of FIG. 5A.

The system 400 facilitates presentment of AR content to the user of the AR/VR device 106 when the user is in an environment that includes a crowd of people. For example, and referring now to FIGS. 5A and 5B, an exemplary environment 500 is shown, wherein a user 502 of an AR/VR device is present among a crowd 504 of people. Referring now solely to FIG. 5A, a top-down view of the environment 500 is illustrated. Referring now solely to FIG. 5B, a view of the environment from the perspective of the user 502 of the AR/VR device is shown. Referring now once again to FIGS. 5A and 5B, the environment 500 can be, for example, a lecture hall. The environment 500 includes a tagging camera system 506 that is configured to capture images of a field-of-view 508 that includes a portion of the environment 500. The user 502 of the AR/VR device can be one of several people in the crowd 504 who are registered as users of a social network server application. The camera 506 captures an image of its field-of-view 508 and transmits them to the social network server application. The social network server application identifies the user 502 of the AR/VR device in the image and a plurality of additional persons 510-514 who are registered with the social network server application. The social network server application can identify portions of the user profile data 140 and/or the social network data 150 that pertain to the additional persons 510-514. The social network server application outputs augmentation data that includes some or all of the identified data that pertains to the additional persons 510-514. Responsive to receipt of the augmentation data, the AR/VR device worn by the user 502 displays an augmentation that is indicative of the identified portions of the user profile data 140 and/or the social network data 150 that pertain to the additional persons 510-514. For example, and referring now solely to FIG. 5B, a tray 516 can be displayed on a display of the AR/VR device worn by the user 502, wherein the tray 516 comprises indicators 518-522 of each of the additional persons 510-514, respectively. Thus, from the perspective of the user 502, as she sits in the crowd 504, her AR/VR device displays an augmentation (i.e., the tray 516) that indicates other users of the social network server application who are present in her environment. Furthermore, as described in detail above, the user 502 can interact with the tray 516 to facilitate interaction with one or more of the additional persons 510-514.

In further embodiments, the systems 100, 400 can be configured to output augmentation data to the AR/VR device 106 based upon a location of the AR/VR device 106. Augmentation data is output to the AR/VR device worn by the user 502 in the environment 500 based upon the user 502 being depicted in a same image as the additional persons 510-514. The system 400 is further capable of outputting augmentation data that relates to objects or persons to an AR/VR device based upon the AR/VR device being present at a location proximal to the objects or persons, even if a user of the AR/VR device is not depicted in a same image as the objects or persons. The AR/VR device 106 can output a location of the AR/VR device 106 (e.g., as indicated by the location sensor in the sensor package 122, by a scanned location code, or by user input) to the social network server application 134.

For example, the sensor package 122 can include a location sensor such as a GPS sensor, a WiFi-based location sensor, or the like. The AR/VR device 106 can be configured to periodically output, to the social network server application 134, a location of the AR/VR device 106 as indicated by the location sensor. In another example, an operating environment of the AR/VR device 106 can include a scannable code (e.g., a barcode, a QR code, or other scannable code). The scannable code can be imprinted on, affixed to, or otherwise presented on an object in the operating environment of the AR/VR device 106. For instance, the scannable code can be printed on a label adhered to the object. In another aspect, the scannable code can be imprinted on the object in ink or as an impression in a surface of the object, or embedded as an infrared tag in the surface of the object. The camera 132 or other sensor in the sensor package 122 can be configured to capture an image and/or sensor data that is representative of the scannable code. The hardware logic component 130 can be configured to determine a location of the object indicated by the scannable code based upon the image and/or sensor data. Responsive to determining the location of the object indicated by the scannable code, the AR/VR device 106 can output the location to the social network server application 134. The social network server application 134 can interpret the location indicated by the scannable code as a location of the AR/VR device 106. In still further embodiments, a user of the AR/VR device 106 can set forth user input (e.g., a gesture, a voice command, text input by way of gesture interaction with a virtual keyboard displayed on the display 120) that is indicative of the location of the user. Responsive to receipt of the user input indicating the location of the user, the AR/VR device 106 can output the location to the social network server application 134.

The social network server application 134 can identify data in the user profile data 140 and/or the social network data 150 that relates to objects and/or persons that are located proximal to the location of the AR/VR device 106. In an exemplary embodiment, the user profile data 140 and/or the social network data 150 can include data entries that are tagged with location data. For instance, the social network data 150 can include photos, documents, or other information that are tagged with location data indicating that the photos, documents, or other information are associated with a location. In another example, the user profile data 140 can include data indicative of locations of users registered with the social network server application 134. The social network server application 134 can identify data entries in the user profile data 140 and/or the social network data 150 that are tagged with location data indicating locations proximal to the location of the AR/VR device 106. The social network server application 134 outputs augmentation data to the AR/VR device 106 that comprises the identified data. Thus, in one example, the social network interface component 152 can cause a tray to be displayed on the display 120, wherein the tray comprises indicators of users registered with the social network server application 134 who are located proximally to the user of the AR/VR device 106.

The system 100 can further facilitate ordering or requesting of items to be delivered to a location of the user of the AR/VR device 106. For example, the user can set forth input to the AR/VR device 106 by interacting with interactive elements in an augmentation environment displayed on the display 120, voice commands, or substantially any other mode of user input. The input can indicate that the user of the AR/VR device 106 wishes to purchase an item such as a beverage, food, clothing, or substantially any other item. The AR/VR device 106 can transmit a purchase request to a computing system operated by a delivery service (e.g., the computing device 156). Responsive to receipt of the purchase request, the computing system can process a transaction for the requested item and can dispatch a courier to deliver the item. In exemplary embodiments, the courier can be a delivery drone, and the computing system can dispatch the delivery drone directly to a location of the AR/VR device 106 (which location may be indicated in the purchase request).

In other examples, the augmentation data output by the social network server application 134 can include data pertaining to events or occurrences that took place or will take place at a location proximal to the location of the AR/VR device 106. For instance, the augmentation data output by the social network server application 134 can include a photo taken by a user registered with the social network server application 134 at a location proximal to the location of the AR/VR device 106. The social network interface component 152 can cause the photo to be displayed on the display 120 of the AR/VR device 106.

In another example, the social network data 150 can include an indication of a gathering that is supposed to take place at a location proximal to the location of the AR/VR device 106. The augmentation data output by the social network server application 134 to the AR/VR device 106 can include data pertaining to the gathering (e.g., precise location of the gathering, start time and duration of the gathering, purpose of the gathering, etc.). Responsive to receipt of the augmentation data, the social network interface component 152 can cause the data pertaining to the gathering to be displayed on the display 120 as a visual augmentation. Further, the social network interface component 152 can cause a selectable button pertaining to the gathering to be displayed on the display 120. Responsive to the user interacting with the selectable button, the social network interface component 152 can output data to the social network server application 134 indicating that the user of the AR/VR device 106 plans to attend the gathering.

The social network server application 134 can be further configured to prioritize data or content that is associated with the user of the AR/VR device 106 for inclusion in the augmentation data sent to the AR/VR device 106. The social network data 150 can include photos, social media posts, documents, or other data relating to a past event with which the user of the AR/VR device 106 was associated. In a non-limiting example, the social network data 150 can include photos and social media posts pertaining to a graduation of the user of the AR/VR device 106 from a university. Thus, when the user of the AR/VR device 106 is present at a same location at which his/her graduation ceremony took place, the social network server application 134 can identify photos, social media posts, documents, or the like pertaining to the graduation ceremonies of many different users registered with the social network server application 134. The social network server application 134 can be configured to identify a subset of the social network data 150 that pertains to the location of the AR/VR device 106 and that also relates to the user of the AR/VR device 106 (e.g., based upon a user identifier provided to the social network server application 134 by the social network interface component 152). The social network server application 134 can configure the augmentation data transmitted to the AR/VR device 106 such that this identified subset of the social network data 150 is preferentially displayed by the social network interface component 152 in augmentations on the display 120.

Hence, responsive to the user of the AR/VR device 106 entering a venue at which her graduation ceremony occurred, the AR/VR device 106 can display augments to the user that pertain to her graduation ceremony. For instance, the AR/VR device 106 can display photos of her graduation ceremony that are stored in the social network data 150. In another example, the AR/VR device 106 can display an indication of where the user sat during her graduation ceremony, which location may be indicated in the social network data 150. The location can be specified as, for example, a chair position or seat number. In other embodiments, the location can be specified as a set of coordinates relative to a specified origin location.

In still another example, the AR/VR device 106 can display an image of a diploma of the user of the AR/VR device 106. In such embodiments, the image of the diploma can be an image included in the social network data 150. In another example, the image of the diploma can be based upon a digital certificate (e.g., an authenticated non-fungible token, or NFT, stored on a blockchain maintained by the social network server 134) indicating that the user obtained the diploma from an institute of higher education.

The AR/VR device 106 and the social network server application 134 can further be configured to facilitate display of augmentations by way of the AR/VR device 106 based upon events occurring in real time. By way of example, a user of the AR/VR device 106 may be present at her own graduation ceremony. The social network data 150 can include an indication that the graduation ceremony is scheduled to occur at an indicated location and an indicated time. If the user of the AR/VR device 106 is present at the indicated location and the indicated time, the social network server application 134 can determine that the user is present at the graduation ceremony. The social network server application 134 can be configured to include, in augmentation data sent to the AR/VR device 106, data submitted to the social network server application 134 by other users present at the graduation ceremony. For example, others present at the graduation ceremony can upload photos of the ceremony to the social network server application 134 for inclusion in the social network data 150. The social network server application 134 can include these photos in augmentation data output to the AR/VR device 106 based upon the presence of the user at the graduation ceremony. It is to be understood that these aspects are applicable, mutatis mutandis, to substantially any type of ongoing or scheduled event, including, but not limited to sporting events, concerts, theater performances, award ceremonies, etc.

In some embodiments, the sensor package 122 includes a temperature sensor. The temperature sensor can be a sensor that is configured to output an indication of an ambient temperature about the AR/VR device 106. The AR/VR device 106 can be configured to display an augmentation on the display 120 based upon the ambient temperature indicated by the temperature sensor. For example, the AR/VR device 106 can be configured to display a numeric value of the temperature on the display 120. In another example, the AR/VR device 106 can display a recommendation on the display 120 based upon the temperature, such as a recommendation that a user of the AR/VR device 106 seek shelter when the ambient temperature is outside a specified range.

In other exemplary embodiments, the temperature sensor can be a thermal camera. In such embodiments, the thermal camera can have an FOV that is at least partially coextensive with an FOV of the user of the AR/VR device 106. The AR/VR device 106 can be configured to display, on the display 120, thermal images output by the thermal camera. In a non-limiting example, the AR/VR device 106 can display thermal images responsive to selection of a thermal image mode of operation of the AR/VR device 106 by the user of the device 106.

Figure 6:
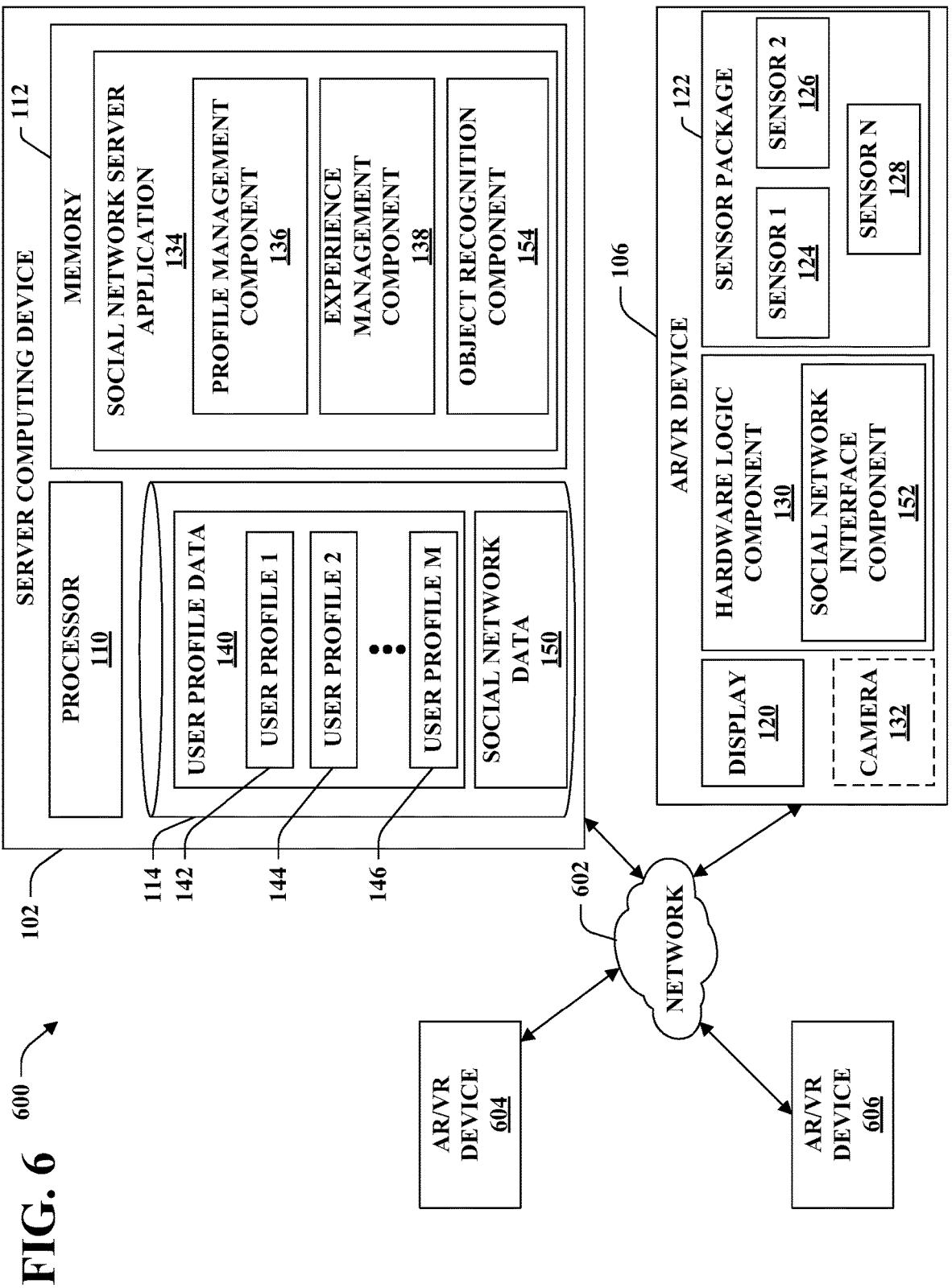
FIG. 6 is a functional block diagram of still another exemplary AR/VR system.

In various embodiments, the social network server 134 can be configured to facilitate a shared AR/VR experience for users of AR/VR devices. Referring now to FIG. 6, an exemplary system 600 is illustrated. The system 600 includes the server computing device 102, the AR/VR device 106, and a network 602 by way of which the server computing device 102 and the AR/VR device 106 communicate. The system 600 further includes additional AR/VR devices 604, 606 that are in communication with one another as well as the AR/VR device 106 and the server computing device 102 by way of the network 602. In exemplary embodiments, the AR/VR device 604, 606 are configured substantially similarly to the AR/VR device 106, such that the AR/VR devices 604, 606 include their own respective displays, sensor packages, hardware logic components, etc. (not shown in FIG. 6).

In an exemplary embodiment, the social network server application 134 receives an indication that the AR/VR devices 106, 604, 606 are located proximally to one another. The social network server application 134 outputs augmentation data that is based upon the AR/VR devices 106, 604, 606 being located proximally to one another to each of the AR/VR devices 106, 604, 606. The augmentation data is configured to cause the AR/VR devices 106, 604, 606 to display augmentations, on their respective displays, that are based upon the AR/VR devices 106, 604, 606 being located proximally to one another. By way of example, and not limitation, the augmentations can include a prompt notification suggesting some manner of interaction among the users of the AR/VR device 106, 604, 606. By way of further example, the augmentations can include interactive prompts that suggest that the users of the AR/VR devices 106, 604, 606 register their gathering as a group event with the social network server application 134 such that the social network server application 134 has a record of the gathering having occurred.

In some embodiments, the augmentation data can be configured to cause the AR/VR devices 106, 604, 606 to display a same augmentation based upon the AR/VR device 106, 604, 606 being located proximally to one another. In a non-limiting example, and referring once again briefly to FIG. 5A, the environment 500 can be a lecture hall. A plurality of people in the crowd 504 (e.g., people 502 and 510-514 who are registered with the social network server 134) can be using AR/VR devices. These AR/VR devices can display a same augmentation that pertains to a lecture being given in the lecture hall (e.g., a graphical depiction of a subject of discussion of the lecture). In another example, and referring again to FIG. 6, the same augmentation displayed by the plurality of AR/VR devices 106, 604, 606 can be configured to facilitate a joint game being played by the users of the AR/VR devices. For instance, the augmentation can be or include an interactive tic-tac-toe board, or an interface for a hangman game.

In connection with facilitating a shared AR/VR experience among users of the AR/VR device 106, 604, 606, the social network server application 134 can be configured to receive interaction data from each of the AR/VR devices 106, 604, 606. For example, the AR/VR devices 106, 604, 606 can be displaying, on their respective displays, a shared interface (e.g., a shared game interface) that is based upon augmentation data received from the server computing device 102. The AR/VR devices 106, 604, 606 can receive user input indicative of user interactions with the shared interface. The AR/VR devices 106, 604, 606 can be configured to transmit interaction data that is based upon the user input to the social network server 134. In a specific example, the AR/VR device 106 can receive user input with respect to the shared interface. Responsive to receipt of the user input, the AR/VR device 106 outputs interaction data to the social network server 134, wherein the interaction data is indicative of a user interaction with the shared interface. The social network server 134 can maintain a shared state pertaining to the shared interface. In an exemplary embodiment, the shared interface can be a shared game interface, and the shared state can be a shared state of the game to which the shared game interface pertains. For example, the shared state can be a state of a tic-tac-toe board. Responsive to receipt of the interaction data, the social network server 134 can update the shared state to which the shared interface pertains. The social network server 134 can then transmit an update to the shared interface to the AR/VR devices 106, 604, 606 based upon the updated shared state. Responsive to receiving the update, the AR/VR device 106, 604, 606 can update the shared interface (e.g., as displayed at each of the devices 106, 604, 606) to indicate the update received from the social network server 134. Referring again to the example of the tic-tac-toe board, the interaction data can be a selection of an empty square on the tic-tac-toe board. The update to the shared state can be an indication that the square was selected. The social network server 134 can transmit an indication to the AR/VR devices 106, 604, 606 that the square was selected. The AR/VR devices 106, 604, 606 can update the respectively displayed tic-tac-toe boards to show that the square was selected.

In further embodiments, the systems 100, 400 can be configured to facilitate a shared VR experience for users of AR/VR devices that is based upon the social network data 150 and/or the user profile data 140. For example, the user profile data 140 and/or the social network data 150 can indicate that a group of users registered with the social network server application 134 attended a same event or were present at a same location in the past. For instance, the user profile data 140 and/or the social network data 150 can include a specific indication that the group of users attended the same event. For instance, the social network data 150 can include a record indicating that the group of users were in attendance at an event registered with the social network server 134. In another example, the user profile data 140 and the social network data 150 can include photos and/or videos of the users in the group of users, where the photos and/or videos indicate that the users attended a same event or were present at a same location. The social network server application 134 can be configured to transmit VR data to a plurality of VR devices operated by the users, wherein the VR data is configured to cause the VR devices to display a same, shared virtual environment. In exemplary embodiments, the shared virtual environment can include photos and/or videos (e.g., that are included in the user profile data 140 or the social network data 150) that depict the users at a same event or location. In other embodiments, the shared virtual environment can include other data that pertain to a same event that the users attended, or a same location at which the users were present. For instance, the shared virtual environment can include indications of people other than the users in the group of users who were also present at the event/location. In another example, the shared virtual environment can include a three-dimensional virtual recreation of the location and/or event.

In some embodiments, the system 600 facilitates interaction between users of the AR/VR devices 106, 604, 606 by way of augmentations displayed on the AR/VR devices 106, 604, 606. In an exemplary embodiment, a user of the AR/VR device 604 can set forth, by way of some user input to the AR/VR device 604 or another device, a status identifier. The status identifier can be communicated to the social network server application 134 by the AR/VR device 604 or other device. Subsequently, the social network server 134 can detect the user of the AR/VR device 604 in sensor data received from one of the other AR/VR devices 106, 606, e.g., AR/VR device 106. The social network server 134 can return the status identifier of the user of the AR/VR device 604 to the AR/VR device 106. The AR/VR device 106, responsive to receipt of the status identifier, can display an augmentation proximally to the user of the AR/VR device 604 on the display 120, wherein the augmentation is indicative of the status identifier. The status identifier can include any of various information that the user of the AR/VR device 604 wishes to be public-facing to other users of the system 600. For example, the status identifier can be or include a business card, an emotional state (e.g., happy, sad, angry, indifferent, etc.), an availability status (e.g., available, busy, do not disturb, on the phone, etc.). In some embodiments, the status identifier output by the AR/VR device 604 to the social network server 134 can indicate that different statuses should be presented to different groups. For instance, the status identifier can specify a public-facing status that can be presented to any user of the system 600, a semi-private status that can be presented to known contacts of the user of the AR/VR device 604 (e.g., as indicated in the user profile data 140), and/or a semi-private status that can be presented to only specified contacts of the user of the AR/VR device 604. The social network server 134 can be configured to return the status identifier of the user of the AR/VR device 604 based upon an identity of the user of the AR/VR device to which the status identifier is being returned.

Status identifiers output by the AR/VR devices 106, 604, 606 to the social network server 134 can be dependent upon location or other sensor data output by sensors included on the AR/VR devices 106, 604, 606. For example, if a user is using the AR/VR device 106 at a restaurant, the sensor package 122 can output location data that indicates that the AR/VR device 106 is located at the restaurant. The AR/VR device 106 can output the location data to the social network server 134. Another AR/VR device, such as the AR/VR device 604 can be operated by a waiter at the restaurant. When the AR/VR device 604 outputs sensor data to the social network server 134 that is indicative of the user of the AR/VR device 106, the social network server 134 can retrieve search results from the user profile data 140 and/or the social network data 150 based upon the AR/VR device 106 being located at the restaurant. For instance, the search results can include an indication of a usual order of the user of the AR/VR device 106 at the restaurant. The social network server 134 can output augmentation data that causes the AR/VR device 604 operated by the waiter to display the usual order of the user of the AR/VR device 106.

In some embodiments, the AR/VR device 106, 604, 606 can be configured to transmit status identifiers to one another directly. For example, the AR/VR devices 106, 604, 606 can be connected by way of a WiFi network, a Bluetooth connection, or other local network connection that is not shared by the server computing device 102. In an exemplary embodiment, the AR/VR device 604 can transmit a status identifier to the AR/VR device 106 by way of such connection. The AR/VR device 106 can then display an augmentation on the display 102 that is based upon the status identifier. Thus, the AR/VR devices 106, 604, 606 can communicate with one another to exchange information based upon which augmentations can be displayed by the AR/VR devices 106, 604, 606, without requiring the social network server 134 to serve as a go-between.

Some augmentations display by the AR/VR device 106 can be time- or condition-limited, such that they will cease being displayed on the display 120 after a specified amount of time has elapsed or a specified condition has been met or has failed to have been met. In a non-limiting example, the AR/VR device 106 can display an augmentation on the display 120 that comprises a selectable icon of a phone number of a person with whom the user of the AR/VR device 106 has recently interacted. The AR/VR device 106 can be configured to cease displaying the selectable icon after a specified amount of time has passed without the user selecting the icon. In another example, the AR/VR device 106 can display an augmentation that indicates a request for payment, and the AR/VR device 106 can be configured to cease displaying the augmentation responsive to the payment being paid. In some embodiments, a time-limited augmentation can be displayed as an ice cube that melts over time as an evocative way to remind the user of the AR/VR device 106 that the augmentation is time-limited.

Figure 7:
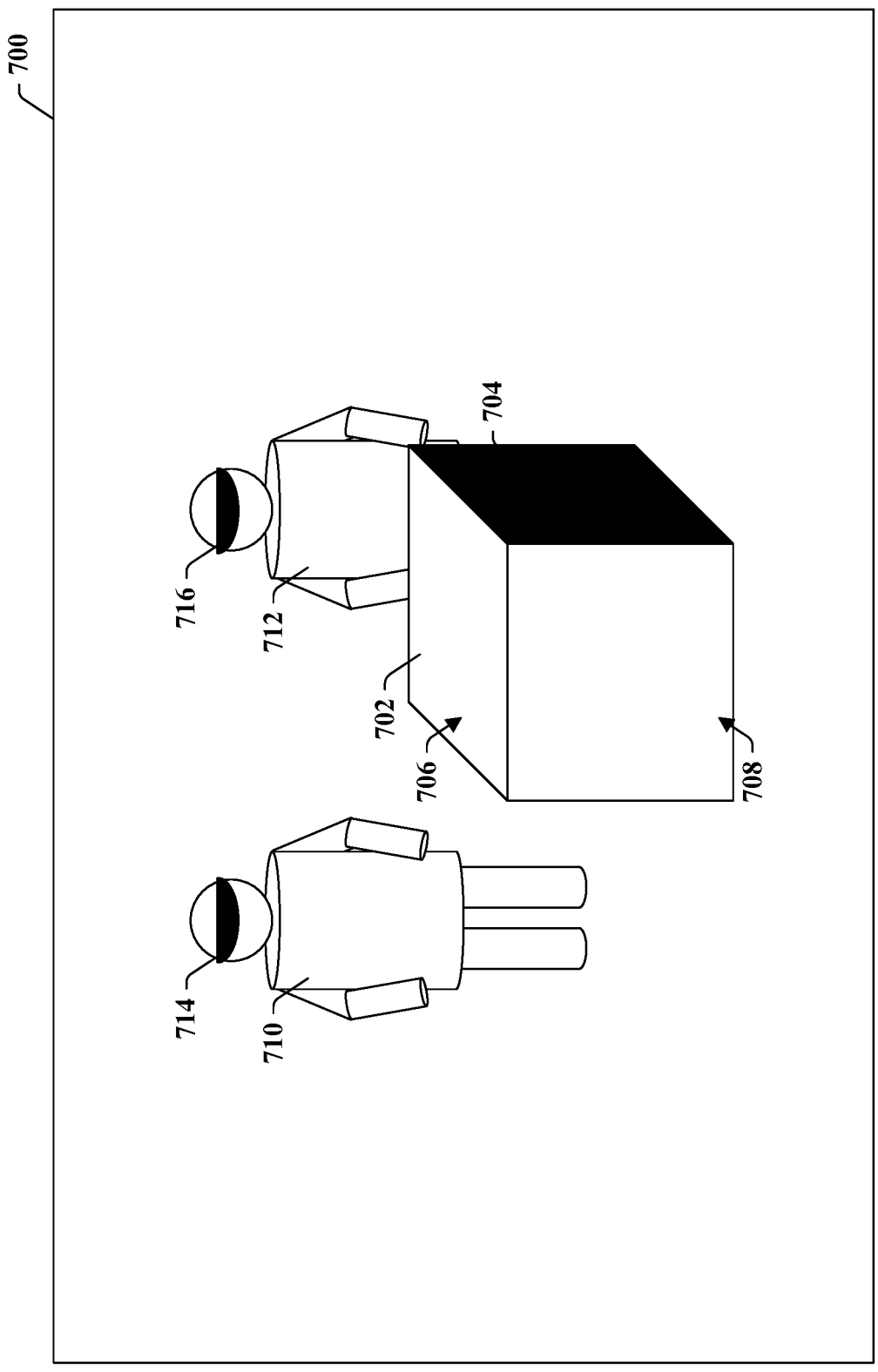
FIG. 7 is a diagram of still another exemplary AR environment.

In various embodiments, a physical object can be configured to function as a hub for AR interaction. Referring now to FIG. 7, an AR environment 700 is shown, wherein the environment 700 includes an AR interaction hub 702. The AR interaction hub 702 comprises a plurality of surfaces 704-708. The AR interaction hub 702 is configured such that the surfaces 704-708 are recognizable by an AR system. In a non-limiting example, a scannable code can be printed on, embedded in, or otherwise affixed to or incorporated in one of the surfaces 704-708. In another example, an AR system can be configured to recognize a shape or other characteristic of the AR interaction hub 702. Responsive to identifying a surface of the AR interaction hub 702 (e.g., by scanning a scannable code, or by identifying the AR interaction hub 702 based on a characteristic of the hub 702), an AR/VR device can display an augmentation at a location of the surface in an FOV of the user of the AR/VR device. The AR interaction hub 702 can facilitate interaction with AR content in modes that may be more natural to a user of an AR/VR device by replicating certain functionality of a computing device such as a tablet. For example, an AR/VR device can display an augmentation that gives one of the surfaces 704-708 the appearance of a touchscreen interface. A user of the AR/VR device can interact with the augmentation by touching one of the surfaces 704-708 in a similar manner to how the user would interact with a mobile computing device with a touchscreen interface. The AR interaction hub 702 can further be configured as a network connection point, such as a WiFi hotspot. Thus, in environments where other wireless data connections are unreliable, functionality of an AR/VR system (e.g., the systems 100, 400, 600) can be maintained by connection of AR/VR devices to the AR interaction hub 702.

Different users interacting with the AR interaction hub 702 can be presented with different augmentations by their respective AR/VR devices. For example, the AR environment 700 further includes users 710, 712 who employ AR/VR devices 714, 716, respectively. The AR/VR device 714 can display a first augmentation to the user 710 on the surface 706. The AR/VR device 716 can display a second augmentation to the user 712 on the same surface 706. Since the augmentations are displayed on displays of the AR/VR devices 714, 716, rather than being projected onto the surface 706, the users 710, 712 can use the AR interaction hub 702 simultaneously without interference with one another or without compromising the privacy of the users.

In some embodiments, the AR interaction hub 702 can include a computing device (not shown) that is configured to communicate with AR/VR devices in proximity to the hub 702. In these embodiments, the AR interaction hub 702 can communicate with AR/VR devices in proximity to the hub 702 to provide the AR/VR devices with locally-stored data. For example, the AR interaction hub 702 can be used as an informational kiosk at a tourist attraction or other location at which travelers are likely to seek out information about their surroundings. The AR interaction hub 702 can communicate data pertaining to the surroundings of the hub 702 to the AR/VR devices 714, 716 that causes the AR/VR devices 714, 716 to display graphical indicia of such data on one or more of the surfaces. In these and other embodiments, the AR interaction hub 702 can be configured to communicate with the AR/VR devices 714, 716 by way of a local data connection that is not reliant on Internet connectivity. Hence, the AR interaction hub 702 can provide a local source of data for AR/VR devices when other sources of data may be inaccessible.

Figure 8:
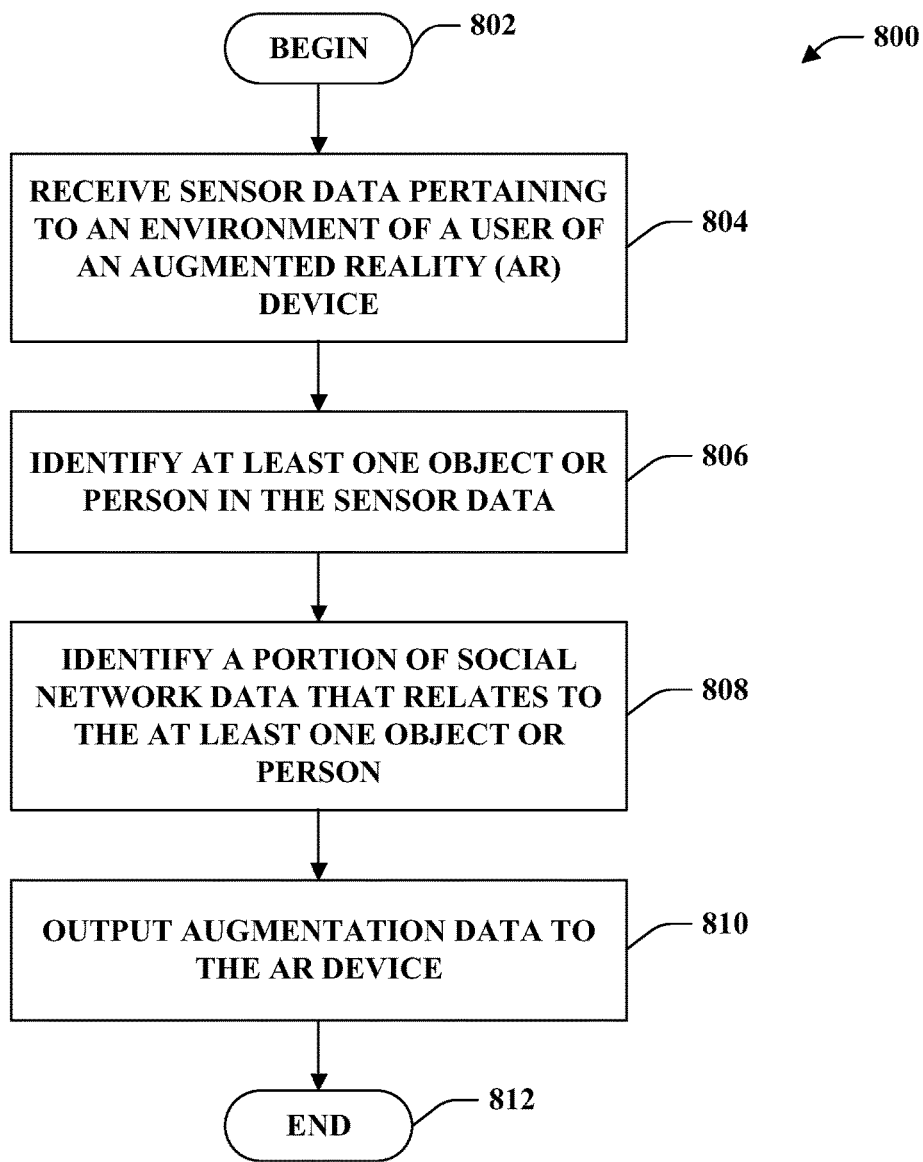
FIG. 8 is a flow diagram that illustrates an exemplary methodology for presentment of context-dependent AR content on an AR/VR device.

FIG. 8 illustrates an exemplary methodology relating to providing context-dependent AR content to a user registered with a social network server application. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 8, a methodology 800 that facilitates presentment of context-dependent AR content to a user of an AR/VR device who is registered with a social network server application is illustrated. The methodology 800 begins at 802, and at 804 sensor data pertaining to an environment of a user of an AR device is received. The AR device can be a device that is in communication with a social network server application that maintains a store of social network data pertaining to various registered users of the social network server application.

At 806, at least one object or person is identified in the sensor data. At 808, a portion of the social network data that is maintained by the social network server application that relates to the object or person identified at 804 is identified. At 810, augmentation data is output to the AR device wherein the augmentation data includes the identified portion of the social network data and is configured to cause the AR device to display a graphical indication of the identified portion of the social network data. The methodology 800 completes at 812.

Figure 9:
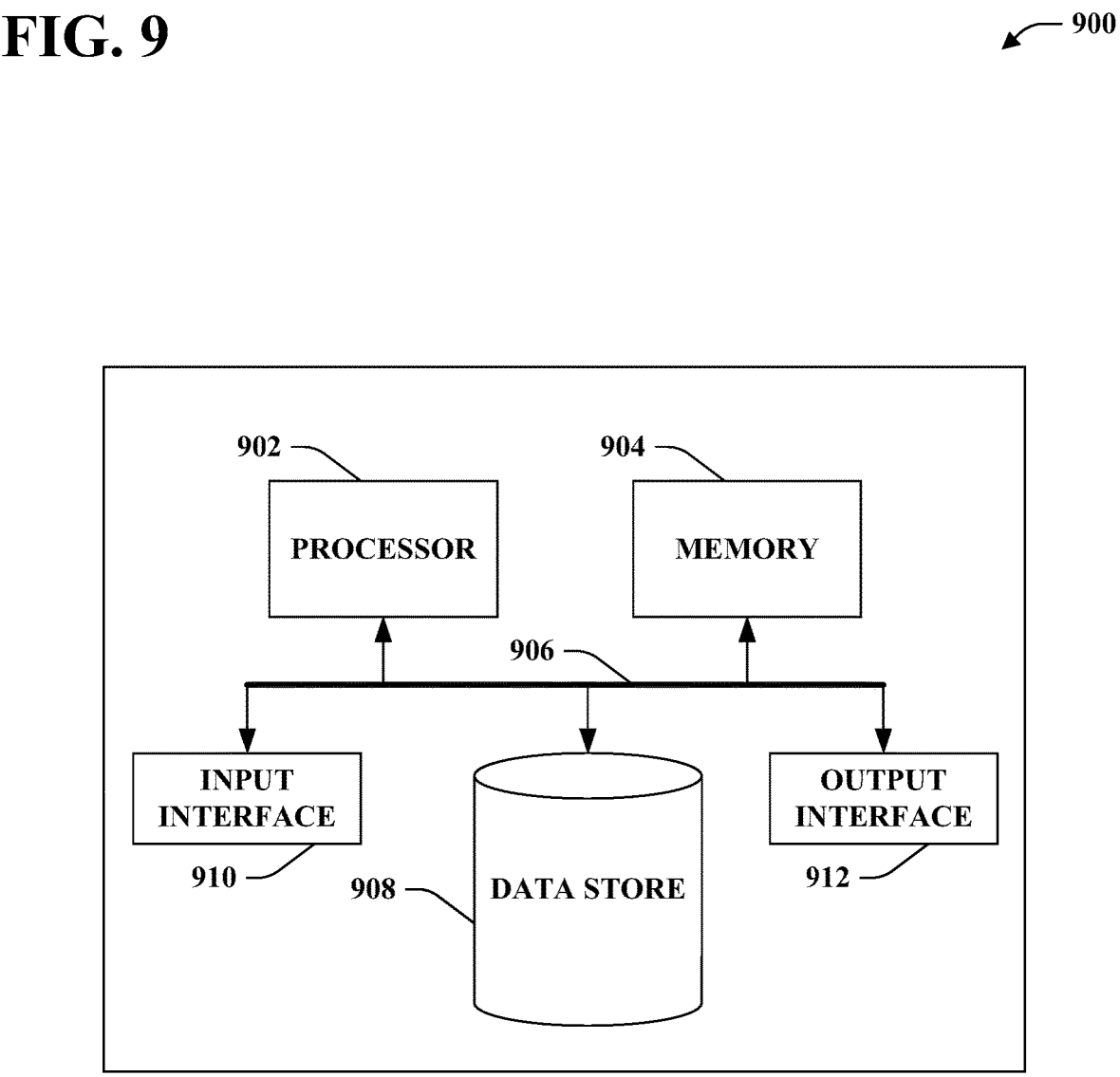
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that facilitates content-dependent presentment of context-dependent AR augmentations by way of an AR/VR device. By way of another example, the computing device 900 can be used in a system that facilitates financial transactions in conjunction with a social network server application. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store social network data, user profile data, augmentation data, or the like.

The computing device 900 additionally includes a data store 908 that is accessible by the processor 902 by way of the system bus 906. The data store 908 may include executable instructions, user profile data, social network data, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor
    a data store that stores social network data pertaining to a plurality of users registered with a social network server application; and
    memory that stores the social network server application, wherein when the social network server application is executed by the processor, the social network server application causes the processor to perform acts comprising:
        receiving sensor data pertaining to an environment of a user of an augmented reality (AR) device that is in communication with the social network server application;
        identifying at least one object or person in the environment of the user based upon the sensor data;
        identifying a portion of the social network data that relates to the at least one object or person;
        outputting augmentation data to the AR device, wherein the augmentation data includes the identified portion of the social network data, wherein responsive to receipt of the augmentation data by the AR device, the augmentation data causes a graphical indication of the identified portion of the social network data to be displayed on a display of the AR device; and
        updating the social network data pertaining to the user based on instructions received from the AR device responsive to the graphical indication of the identified portion of the social network data being displayed on the display of the AR device.

2. The system of claim 1, wherein the sensor data comprises an image of the environment of the user.

3. The system of claim 2, wherein the image of the environment of the user is received from a camera that is not included on the AR device, wherein identifying the at least one object or person in the environment of the user comprises:
    identifying the at least one object or person in the image; and
    determining that the image also includes the user of the AR device.

4. The system of claim 1, wherein the sensor data comprises a location of the user, wherein identifying the at least one object or person in the environment of the user comprises determining that a location of the at least one object or person is proximal to the location of the user.

5. The system of claim 1, wherein identifying the at least one object or person comprises identifying a person in the environment of the user, wherein the identified portion of the social network data includes an identifier of the person.

6. The system of claim 5, wherein further the identified portion of the social network data includes a current status message pertaining to the identified person, wherein the graphical indication is indicative of the current status message.

7. The system of claim 1, wherein the graphical indication comprises a selectable button that, when selected by the user of the AR device, causes the AR device to transmit the instruction to the social network server application that causes the social network server application to update social network data pertaining to the user.

8. The system of claim 1, wherein identifying the at least one object or person in the environment of the user comprises identifying an object and a person in the environment of the user, the identified person being a user registered with the social network application, the acts further comprising:
    identifying a category associated with the identified object; and
    updating a portion of the social network data that pertains to the identified person based upon the category of the identified object.

9. The system of claim 8, wherein the updating the portion of the social network data is based upon locations of the identified person and the identified object indicated by the sensor data being proximal to one another.

10. A computer-readable storage medium comprising instructions that, when executed by a processor, cause the processor to perform acts comprising:
    responsive to receiving sensor data pertaining to an environment of a user of an augmented reality (AR) device that is in communication with a social network server application, identifying at least one object or person in the environment of the user based upon the sensor data;

identifying a portion of social network data maintained by the social network server application that relates to the at least one object or person;

outputting augmentation data to the AR device, wherein the augmentation data includes the identified portion of the social network data, wherein responsive to receipt of the augmentation data by the AR device, the augmentation data causes a graphical indication of the identified portion of the social network data to be displayed on a display of the AR device; and updating the social network data pertaining to the user based on instructions received from the AR device responsive to the graphical indication of the identified portion of the social network data being displayed on the display of the AR device.

11. The computer-readable storage medium of claim 10, wherein the graphical indication comprises a selectable button that, when selected by the user of the AR device, causes the AR device to transmit the instruction to the social network server application that causes the social network server application to update social network data pertaining to the user.

12. A method, comprising:

responsive to receiving sensor data pertaining to an environment of a user of an augmented reality (AR) device that is in communication with a social network server application, identifying at least one object or person in the environment of the user based upon the sensor data;

identifying a portion of social network data maintained by the social network server application that relates to the at least one object or person;

outputting augmentation data to the AR device, wherein the augmentation data includes the identified portion of the social network data, wherein responsive to receipt of the augmentation data by the AR device, the augmentation data causes a graphical indication of the identified portion of the social network data to be displayed on a display of the AR device; and updating the social network data pertaining to the user based on instructions received from the AR device responsive to the graphical indication of the identified portion of the social network data being displayed on the display of the AR device.

13. The method of claim 12, wherein the sensor data comprises an image of the environment of the user.

14. The method of claim 13, wherein the image of the environment of the user is received from a camera that is not included on the AR device, wherein identifying the at least one object or person in the environment of the user comprises:

identifying the at least one object or person in the image; and determining that the image also includes the user of the AR device.

15. The method of claim 12, wherein the sensor data comprises a location of the user, wherein identifying the at least one object or person in the environment of the user comprises determining that a location of the at least one object or person is proximal to the location of the user.

16. The method of claim 12, wherein identifying the at least one object or person comprises identifying a person in the environment of the user, wherein the identified portion of the social network data includes an identifier of the person.

17. The method of claim 16, wherein further the identified portion of the social network data includes a current status message pertaining to the identified person, wherein the graphical indication is indicative of the current status message.

18. The method of claim 12, wherein the graphical indication comprises a selectable button that, when selected by the user of the AR device, causes the AR device to transmit the instruction to the social network server application that causes the social network server application to update social network data pertaining to the user.

19. The method of claim 12, wherein identifying the at least one object or person in the environment of the user comprises identifying an object and a person in the environment of the user, the identified person being a user registered with the social network application, the method further comprising:

identifying a category associated with the identified object; and updating a portion of the social network data that pertains to the identified person based upon the category of the identified object.

20. The method of claim 19, wherein the updating the portion of the social network data is based upon locations of the identified person and the identified object indicated by the sensor data being proximal to one another.

* * * * *